(No Model.)
J. A. HARRINGTON.
Spoke Socket.
No. 232,267.                    Patented Sept. 14, 1880.
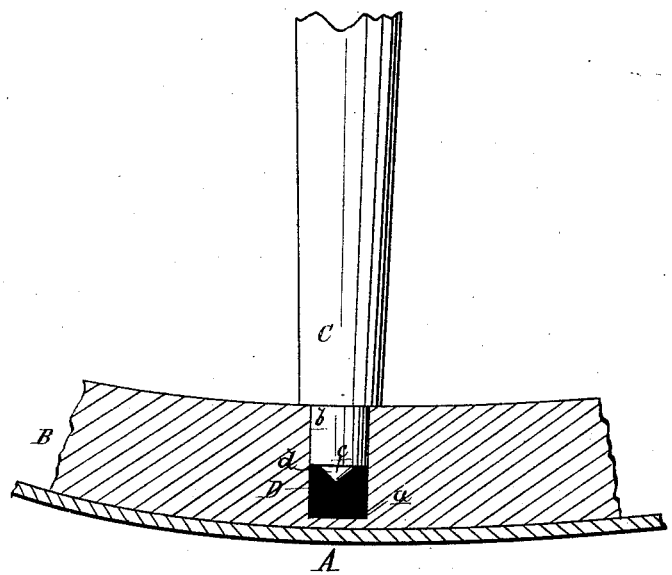
WITNESSES:
INVENTOR:
J. A. Harrington
BY
ATTORNEYS.

UNITED STATES PATENT OFFICE.

JOHN A. HARRINGTON, OF GROESBECK, TEXAS.

SPOKE-SOCKET.

SPECIFICATION forming part of Letters Patent No. 232,267, dated September 14, 1880.

Application filed May 19, 1880. (No model.)

*To all whom it may concern:*

Be it known that I, JOHN A. HARRINGTON, of Groesbeck, in the county of Limestone and State of Texas, have invented a new and Improved Vehicle-Wheel, of which the following is a specification.

The object of this invention is to provide a simple device for preventing the tire from becoming loose because of the shrinking of the felly, and for preventing the loosening and rattling of the spokes.

The drawing represents a sectional side elevation of a section of a wheel, showing the application of the device.

In the drawing, A represents the wheel-tire; B, the felly, having spoke mortises or sockets $a$ extending nearly through the said felly to the outer circumference thereof.

C is a spoke provided with tenon $b$, whose extreme end is formed into a conical point, as shown at $c$, and D is the plug or cushion of rubber or other elastic substance fitted into the socket $a$, and having in its upper face an indentation, $d$, corresponding with the conical point $c$ of the spoke C.

In constructing this wheel the spokes C are forced into the sockets $a$ upon the elastic cushion D, so as to compress said cushion nearly to its extreme limit in order that its expansion may be greater.

The advantages of this device are that however much the felly B may shrink, it is pressed tightly outward against the tire A by the elasticity of the rubber cushion D, whose expansion compensates for the said shrinkage, so that the tire need never be cut or shrunk and shortened to make it fit properly upon the felly.

The spoke C being constantly pressed toward the hub of the wheel by the elastic cushion D will never work loose in the hub, and said spoke C will always be kept in the center of the socket $a$ by the pressure of the central conical point, $c$, of the spoke in the central conical indentations, $d$, of the cushion D, thereby preventing any rattling of spokes while wheel is in motion.

There being an elastic cushion, D, in each spoke-socket $a$, the wheel suffers little or no injury in running over rough roads, and the ill effects to the vehicle and all its parts produced by sharp and sudden jolts are greatly diminished by the application of this device.

Having thus described my invention, I claim as new and desire to secure by Letters Patent—

1. In a vehicle-wheel, the combination, with the felly B, provided with spoke-sockets $a$, extending partly through said felly, of the elastic cushions D, set in said sockets, and spokes C, substantially as herein shown and described.

2. In a vehicle-wheel, the combination, with the spokes C, provided with central conical points, $c$, of the elastic cushions D, provided with central conical indentations, $d$, substantially as and for the purpose described.

JNO. A. HARRINGTON.

Witnesses:
M. H. CLARK,
R. WILEY.